(12) United States Patent
Chan et al.

(10) Patent No.: US 12,293,159 B1
(45) Date of Patent: May 6, 2025

(54) GRAMMAR PRACTICE ITEM CREATION USING LANGUAGE MODELS

(71) Applicant: Educational Testing Service, Princeton, NJ (US)

(72) Inventors: Sophia Chan, Coquitlam (CA); Swapna Somasundaran, Plainsboro, NJ (US)

(73) Assignee: Educational Testing Service, Princeton, NJ (US)

( * ) Notice: Subject to any disclaimer, the term of this patent is extended or adjusted under 35 U.S.C. 154(b) by 339 days.

(21) Appl. No.: 17/746,194

(22) Filed: May 17, 2022

Related U.S. Application Data

(60) Provisional application No. 63/189,796, filed on May 18, 2021.

(51) Int. Cl.
    G06F 40/40      (2020.01)
    G06F 40/205     (2020.01)
    G06F 40/253     (2020.01)

(52) U.S. Cl.
    CPC ............ G06F 40/40 (2020.01); G06F 40/205 (2020.01); G06F 40/253 (2020.01)

(58) Field of Classification Search
    CPC .. G06F 16/00; G06F 16/3329; G06F 16/3344; G06F 16/35; G06F 17/00; G06F 17/2785; G06F 40/00; G06F 40/30; G06F 40/284; G06F 40/211; G06F 40/253; G06F 40/289; G06F 40/216; G06F 40/205; G06F 40/295; G06F 40/35; G06F 40/279; G06F 40/40; G06N 3/00; G06N 3/08; G06N 3/045; G06N 3/044; G06N 5/00;
    (Continued)

(56) References Cited

U.S. PATENT DOCUMENTS

| | | | | |
|---|---|---|---|---|
| 6,484,010 | B1 * | 11/2002 | Sheehan | G09B 7/02 |
| | | | | 434/350 |
| 2019/0103038 | A1 * | 4/2019 | Nielson | A61B 5/411 |
| 2019/0362265 | A1 * | 11/2019 | Agarwalla | G06N 20/00 |

OTHER PUBLICATIONS

Lewis, M., Liu, Y., Goyal, N., Ghazvininejad, M., Mohamed, A., Levy, O., Stoyanov, V. and Zettlemoyer, L., (2019) Bart: Denoising sequence-to-sequence pre-training for natural language generation, translation, and comprehension. arXiv preprint arXiv:1910.13461 (Year: 2019).*

(Continued)

*Primary Examiner* — Daniel C Washburn
*Assistant Examiner* — Sean E Serraguard
(74) *Attorney, Agent, or Firm* — Jones Day

(57) ABSTRACT

Automatic content generation by one or more computing devices can include receiving data comprising an original sentence with a grammar artifact of interest. Thereafter, a plurality of distractor candidates are generated based on the original sentence with the grammar artifact of interest. At least one machine learning-based language model then scores each of the distractor candidates. These scores characterize a likelihood of the corresponding distractor candidate being selected as part of an assessment by a subject. The distractor candidates can be filtered to result in a filtered list of distractor candidates from which the x top scoring distractor candidates can be selected. A grammar practice item is then generated based on the original sentence and the x top scoring distractor candidates. The grammar practice can then be provided. Related apparatus, systems, and articles are also described.

19 Claims, 3 Drawing Sheets

(58) Field of Classification Search
CPC .......... G06N 5/022; G06N 5/04; G06N 20/00; G10L 15/00; G10L 15/22; G10L 15/26
See application file for complete search history.

(56) References Cited

OTHER PUBLICATIONS

Chung, H. L., Chan, Y. H., & Fan, Y. C. (2020). A BERT-based distractor generation scheme with multi-tasking and negative answer training strategies. arXiv preprint arXiv:2010.05384 (Year: 2020).*

Mozafari, J., Fatemi, A., & Nematbakhsh, M. A. (2019). BAS: an answer selection method using BERT language model. arXiv preprint arXiv:1911.01528. (Year: 2019).*

Liu, Yinhan. "ROBERTa: a robustly optimized BERT pretraining approach." arXiv preprint arXiv:1907.11692 364 (Year: 2019).*

Devlin, Jacob; Chang, Ming-Wei, Lee, Kenton, Toutanova, Kristina; BERT: Pre-Training of Deep Bidirectional Transformers for Language Understanding; Proceedings of the Conference of the North American Chapter of the Association for Computational Linguistics: Human Language Technologies, vol. 1; Minneapolis, MN; pp. 4171-4186; Jun. 2019.

Gao, Lingyu, Gimpel, Kevin, Jensson, Arnar; Distractor Analysis and Selection for Multiple-Choice Cloze Questions for Second-Language Learners; Proceedings of the 15th Workshop on Innovative Use of NLP for Building Educational Applications; pp. 102-114; Jul. 2020.

Lewis, Mike, Liu, Yinhan, Goyal, Naman, Ghazvininejad, Marjan, Mohamed, Abdelrahman, Levy, Omer, Stoyanov, Ves, Zettlemoyer, Luke; BART: Denoising Sequence-to-Sequence Pre-training for Natural Language Generation, Translation, and Comprehension; Proceedings of the 58th Annual Meeting of the Association for Computational Linguistics; pp. 7871-7880; Jul. 2020.

Zeno, Susan, Ivens Stephen, Millard, Robert, Duvvuri, Raj; The Educator's Word Frequency Guide; Brewster, NY: Touchstone Applied Science Associates; 1995.

* cited by examiner

GRAMMAR PRACTICE ITEM CREATION USING LANGUAGE MODELS

RELATED APPLICATION

This application claims priority to U.S. Pat. App. Ser. No. 63/189,796 filed on May 18, 2021, the contents of which are hereby fully incorporated by reference.

TECHNICAL FIELD

The subject matter described herein relates to advanced computer-based techniques for creating grammar practice items using machine learning-based language models.

BACKGROUND

Grammar practice is critical to writing skill development and hence integral to any language learning environment. Computer-based Automated Content Generation (ACG) in which grammar practice items are generated for assessment purposes is important for large-scale item development. Large-scale grammar practice item development is necessary for test security (e.g., limiting the reuse of items in tests, etc.) and personalized learning environments (e.g. student-specific learning materials and test items, etc.). Automation of content generation is needed to achieve scalability and sustainability goals of assessment development.

SUMMARY

In one aspect, automatic content generation by one or more computing devices can include receiving data comprising an original sentence with a grammar artifact of interest. Thereafter, a plurality of distractor candidates are generated based on the original sentence with the grammar artifact of interest. At least one machine learning-based language model then scores each of the distractor candidates. These scores characterize a likelihood of the corresponding distractor candidate being selected as part of an assessment by a subject. The distractor candidates can be filtered to result in a filtered list of distractor candidates from which the x top scoring distractor candidates can be selected. A grammar practice item is then generated based on the original sentence and the x top scoring distractor candidates. The grammar practice can then be provided.

Providing, in this context, can include providing the grammar practice item to a consuming application or process. Providing can additionally or alternatively include one or more of causing the grammar practice item to be displayed in an electronic visual display, storing the grammar practice item in physical persistence, loading the grammar practice item into memory, or transmitting data encapsulating the grammar practice item over a computer network to a remote computing system.

The machine learning-based language model can be a bidirectional encoder representations from transformers (BERT) model and/or a Bidirectional and Auto-Regressive Transformers (BART) model. Such models can be fine-tuned using an additional data set directed to grammar practice items.

The filtering, in some variations, can use a plurality of heuristics to determine which, if any, of the distractor candidates to filter out from the generated plurality of distractor candidates. The heuristics can take varying forms including one or more of: filtering out distractor candidates having a relative score difference with a score of the original sentence beyond a first relative threshold, filtering out distractor candidates having a relative score difference with a score of the original sentence within a second relative threshold, or discarding the original sentence if any of the distractor candidates have a higher score. In addition or in the alternative, the filtering can use at least one machine learning model different from the at least one machine learning-based language model to determine which, if any, of the distractor candidates to filter out from the generated plurality of distractor candidates.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter allows for more likely selected alternatives to grammar practice items thereby providing enhanced computer-based assessment generation which, in turns, use fewer computing resources.

The details of one or more variations of the subject matter described herein are set forth in the accompanying drawings and the description below. Other features and advantages of the subject matter described herein will be apparent from the description and drawings, and from the claims.

DETAILED DESCRIPTION

The current subject matter is directed to enhanced computer-based techniques for generating grammar practice items which can be used for assessment of language development.

Figure 1:
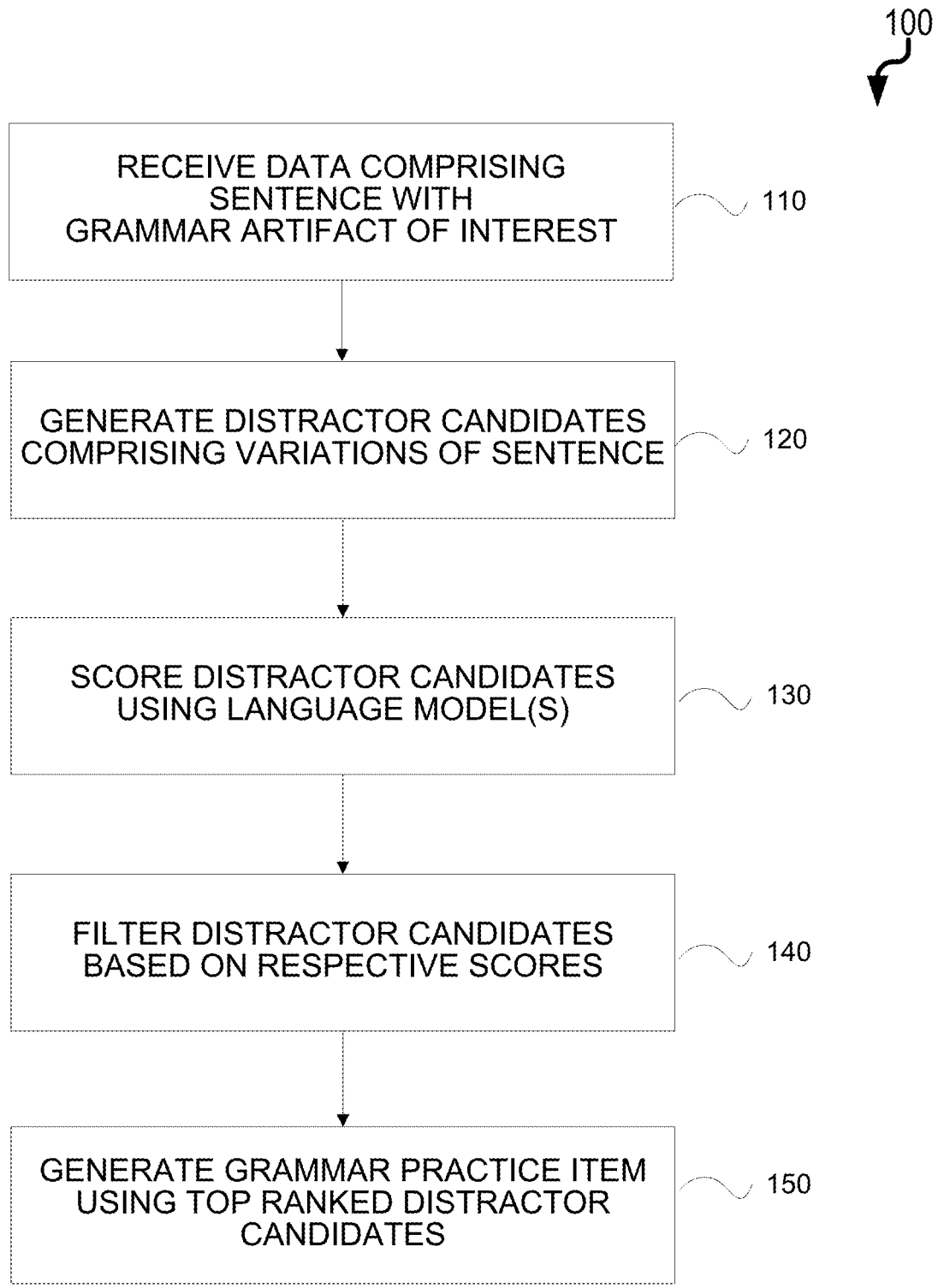
FIG. 1 is a process flow diagram illustrating grammar practice item creation using language models.

FIG. 1 is a process flow diagram 100 illustrating a computer-based technique for generating grammar practice items in which, at 110, data is received that comprises a sentence with a grammar artifact of interest. The grammar artifact of interest can take varying forms including a sentence with a comma (such as the example provided below) as well as grammar aspects directed to parts of speech, parts of a sentence, punctuation, capitalization, common grammar mistakes, and easily confused words.

Thereafter, at 120, variations (e.g., all possible variations, a set number of variations, etc.) of the sentence are generated in which the grammar artifact of interest is removed or replaced with a competing artifact. For example, a comma can be removed from its original location and placed elsewhere in the sentence. Or, alternatively, the comma is replaced with a semicolon. These variations referred to herein are as distractor candidates. Subsequently, at 130, the distractor candidates can be scored using a machine learning-based language model (or multiple models). This language model can take varying forms including atrigram model, a transformer network such as a bidirectional encoder representations from transformers (BERT) model, a Bidirectional and Auto-Regressive Transformers (BART) model (as described in Lewis. M., Liu. Y., Goval. N., Ghazvininejad, M., Mohamed, A., Levy. O., Stovanov. V. & Zettlemoyer. L. (2019). BART: Denoising Sequence-to-Sequence Pre-training for Natural Language Generation. Translation, and Comprehension. CoRR, abs/1910.13461), and the like. Further experimental details regarding the use of a BERT model are provided below. These scores are used, at 140, to optionally filter out distractor candidates that are either too plausible or not plausible enough (as provided by the corresponding score). The top ranked distractor candidates (based on score) can be selected, at 150, for the assessment. For example, the top three distractor candidates can be utilized (and presented in an assessment along with the original sentence).

Sentence Selection. The first step is to select an authentic sentence (i.e., a grammatically correct sentence) from a corpus of interest. For example, textbooks (e.g. TASA, etc.), literature (e.g. LitBank, etc.), informational pages (e.g. Wikipedia) or news (e.g. Tipster) can be used. The selection of the corpus can, for example, depend on the target audience. Such selection can, for example, be automatic via one or more computer-implemented processes which identify potential sentences of interested within such corpus. In some variations, several potential sentences can be displayed in a graphical user interface (GUI) allowing a user to select one of such sentences.

The selected sentence should contain the artifact of interest. For example, to create a punctuation (specifically comma placement) practice item, the selected sentence needs to contain a comma. For a preposition practice item, a sentence with a clear prepositional usage should be selected.

Distractor Candidate Generation. Distractor candidates can be generated through a computer-implemented process which automatically creates incorrect versions of the original sentence. The error is introduced in the grammar artifact of interest. For example, for a comma insertion item given below there is the original sentence and the corresponding distractor candidates. The distractors are all possible replacements (e.g. replace one article with another), or all possible relocations (relocation the punctuation to another spot in the sentence).

Original: If you believe there is an error on your bill, you should act immediately.

Distractor candidates:
1. If you believe there is an error, on your bill you should act immediately.
2. If you believe there is an error on your bill you should act, immediately.
3. If you believe there is an error on your bill you should, act immediately.
4. If you believe there, is an error on your bill you should act immediately.
5. If you believe, there is an error on your bill you should act immediately.
6. If you believe there is, an error on your bill you should act immediately.
7. If, you believe there is an error on your bill you should act immediately.
8. If you, believe there is an error on your bill you should act immediately.
9. If you believe there is an, error on your bill you should act immediately.
10. If you believe there is an error on, your bill you should act immediately.
11. If you believe there is an error on your bill you, should act immediately.
12. If you believe there is an error on your, bill you should act immediately.

Scoring Distractor Candidates. The generated distractor candidates can be scored using a machine learning model (or an ensemble of machine learning models). In one example, the BERT language model (LM) can be used to generate a score which determines the probability of a distractor candidate being a typical language use as defined by the corpora used to train the language model. In the case of the distractor candidates listed above, the process can mask the location of the comma and let the language model predict the token for the mask. Below is the transformed (i.e. masked) original sentence from the example above (i.e., the artifact is replaced with the MASK).

1. If you believe there is an error [MASK] on your bill you should act immediately.

The probability that the LM assigns a comma for that mask is taken as the score for that candidate. In practice, the score can be or be based on a negative of the log of the probability. The log probability for all the candidates generated by the LM is given below:

1. If you believe there is an error on your bill, you should act immediately. 8.37934684753418
2. If you believe there is an error, on your bill you should act immediately. 6.419840335845947
3. If you believe there is an error on your bill you should act, immediately. 4.931217193603516
4. If you believe there is an error on your bill you should, act immediately. 4.824611186981201
5. If you believe there, is an error on your bill you should act immediately. 4.389460563659668
6. If you believe, there is an error on your bill you should act immediately. 4.304722785949707
7. If you believe there is, an error on your bill you should act immediately. 4.19579553604126
8. If, you believe there is an error on your bill you should act immediately. 3.9387693405151367
9. If you, believe there is an error on your bill you should act immediately. 3.642354965209961
10. If you believe there is an, error on your bill you should act immediately. 3.0362443923950195
11. If you believe there is an error on, your bill you should act immediately. 2.9221184253692627
12. If you believe there is an error on your bill you, should act immediately. 2.4847822189331055
13. If you believe there is an error on your, bill you should act immediately. 1.3511104583740234

Notice above that the original sentence (shown in bold) and its corresponding comma location is also masked and input to the LM (resulting in a score). In the above case, the original sentence is the highest scoring option (most probable sentence). All other options score below it. As the scores decrease, the sentences become more improbable.

Filtering Distractor Candidates. Each target sentence (sentence containing the grammar artifact) in a document can be used to generate a number of distractor candidates. Additionally, each corpus provides hundreds of thousands of sentences. In this scenario, filtering is needed to weed out items that are not viable. Multiple choice item distractors need to be plausible—that is, they cannot be obviously incorrect which would allow the learner to eliminate them without knowing the true construct. On the other hand, the distractors cannot be correct alternatives, or too close to the target. This will cause undesirable confusion and even the students who know the construct will get the items wrong.

As seen in the example in the previous section, each distractor is associated with a score. The following heuristics can be used for selecting m (m=3 in this example) distractors and creating an item:

1. Discard the original sentence from any further processing if there are any distractors that get a score higher than the original. This is an indicator that the original sentence was not clear to start with and will not yield a reliable item
2. Filter out distractors that have scores too close to the original (too plausible). This similarity can be based, for example, on a threshold difference from the original such as a difference of 1 score point or less.
3. Filter out distractors which have scores too far below from the original (i.e., lower than a particular differential threshold/absolute threshold). This threshold can, for example, be a difference of 4 score points.
4. Filter out candidates that are unlikely English sentences. For example, distractor candidates can be filtered out that have a log probability value of less than a threshold such as 4.

The above thresholds were set by inspecting the data. These thresholds are specific to comma insertion cloze items. Cloze in this regard refers to a test of reading comprehension that involves having the person being tested supply words which have been systematically deleted from a text. The thresholds (i.e., the threshold values) can be different for other grammar practice item types.

If, after the application of the above rules, there are more than x distractor candidates (e.g., x=3, etc.), the top x scoring distractor candidates can be selected. If the filtering results in fewer than x candidates remaining, the item development for that target (i.e., the original sentence with grammar artifact of interest) can be discarded.

Figure 2:
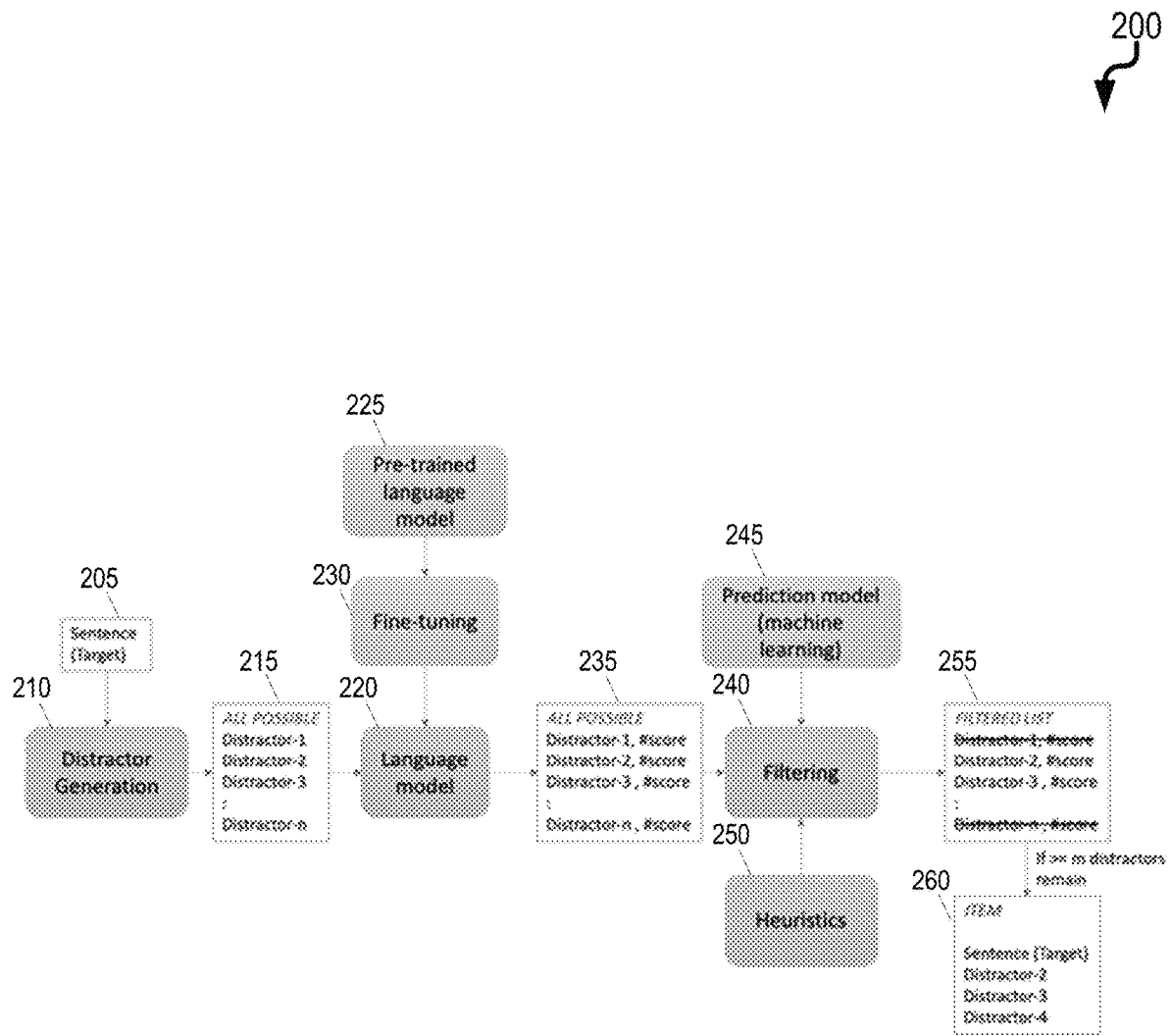
FIG. 2 is a logical diagram illustrating grammar practice item creation using language models.

FIG. 2 is a diagram 200 illustrating a logical diagram of a computer-implemented process for creating grammar practice items using machine learning models. A sentence 205 can be input into a distractor generation function/algorithm 210 which then generates a plurality of distractor candidates 215. The distractor candidates 215 are individually input into a language model 220 to reach receive a score 240 that a likelihood of a user selecting such distractor candidate as being accurate. The language model 220 can take various forms including a pre-trained language model 225 which can be a BERT or BART machine learning model. The pre-trained language model 225 can be fine-tuned 230 for the particular application (namely grammar practice item creation). Such fine tuning can include continuing to train the general language model (e.g., BERT model, etc.) with data specific to the current purposes. For example, test taker responses from TOEFL can be used to trained the general language model. In some variations, masked language modeling can be used in which a certain percentage of the words are masked and the model is asked to predict such masked words. With such an implementation, the language model (e.g., BERT model) is updated with corpus statistics from the new dataset. The scored distractor candidates 235 can be filtered 240 to remove various distractor candidates for factors such as those described above to result in a filtered list 250. The filtering 240 can be based on a prediction model 245 comprising one or more machine learning models and/or heuristics 250 which act to predict whether each distractor candidate should be kept or filtered out The prediction model 245 can take varying forms including a linear regression model or a model consisting of a sequence classification head connected to BERT. The distractor candidate and the language model probability are inputted. The prediction model 245 can include learner attributes such as a representation of their proficiency (e.g., their score on a set of reading comprehension questions), and information about the distractor candidate such as the perplexity from the language model and/or the complexity (e.g., from TextEvaluator). The top x distractor candidates from the filtered list 255 result in a grammar practice item 260. This grammar practice item 260 can then be used for various assessment purposes including computer-generated and implemented tests and the like.

Figure 3:
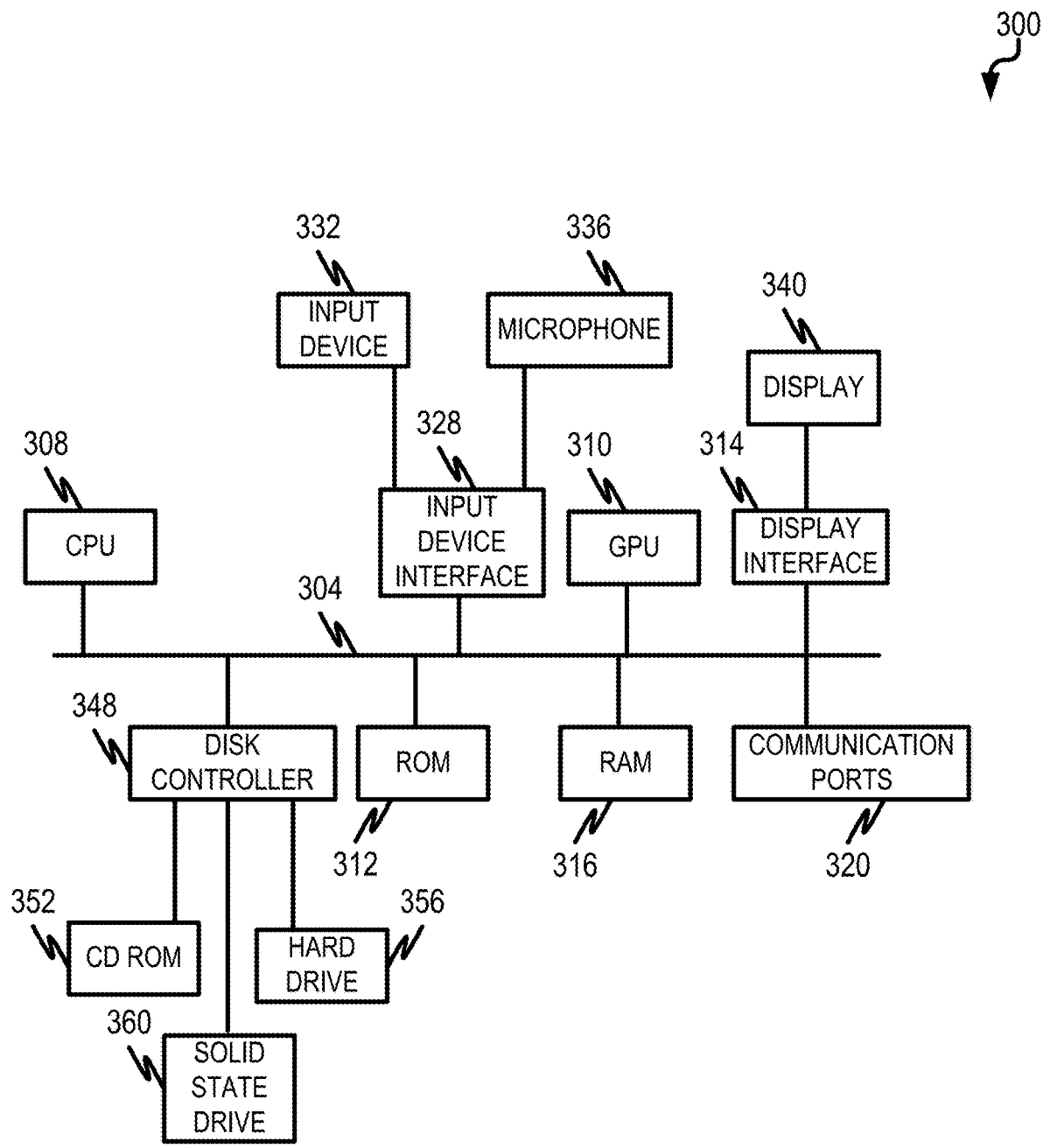
FIG. 3 is a diagram illustrating aspects of a computing device for implementing the subject matter provided herein.

FIG. 3 is a diagram 300 illustrating a sample computing device architecture for implementing various aspects described herein. A bus 304 can serve as the information highway interconnecting the other illustrated components of the hardware. A processing system 308 labeled CPU (central processing unit) (e.g., one or more computer processors/data processors at a given computer or at multiple computers) and/or a processing system 309 labeled GPU (graphical processing unit) can perform calculations and logic operations required to execute a program. A non-transitory processor-readable storage medium, such as read only memory (ROM) 312 and random access memory (RAM) 316, can be in communication with the processing system 308 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 348 can interface with one or more optional disk drives to the system bus 304. These disk drives can be external or internal solid state drives such as 360, external or internal CD-ROM, CD-R, CD-RW or DVD drives such as 352, or external or internal hard drives 356. As indicated previously, these various disk drives 352, 356, 360 and disk controllers are optional devices. The system bus 304 can also include at least one communication port 320 to allow for communication with external devices either physically connected to the computing system or available externally through a wired or wireless network. In some cases, at least one communication port 320 includes or otherwise comprises a network interface.

To provide for interaction with a user, the subject matter described herein can be implemented on a computing device having a display device 340 (e.g., a CRT (cathode ray tube) or LCD (liquid crystal display) monitor) for displaying information obtained from the bus 304 via a display interface 314 to the user and an input device 332 such as keyboard and/or a pointing device (e.g., a mouse or a trackball) and/or a touchscreen by which the user can provide input to the computer. Other kinds of input devices 332 can be used to provide for interaction with a user as well; for example, feedback provided to the user can be any form of sensory feedback (e.g., visual feedback, auditory feedback by way of a microphone 336, or tactile feedback);

and input from the user can be received in any form, including acoustic, speech, or tactile input. The input device 332 and the microphone 336 can be coupled to and convey information via the bus 304 by way of an input device interface 328. Other computing devices, such as dedicated servers, can omit one or more of the display 340 and display interface 314, the input device 332, the microphone 336, and input device interface 328.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method for automatic content generation comprising:
   receiving data comprising an original sentence with a grammar artifact of interest;
   inputting the received data into a distractor generation function to generate a plurality of distractor candidates based on the original sentence with the grammar artifact of interest, each distractor candidate comprising a different variation of the original sentence with an error;
   scoring, using at least one machine learning-based language model, each of the distractor candidates, the scores characterizing a likelihood of such distractor candidate being selected as part of an assessment by a subject, the scoring being based on: masking, for each of the distractor candidates, a location of each error within the corresponding variation of the original sentence; and obtaining a predicted token for the masked error locations from the machine learning-based language model;
   filtering the distractor candidates to result in a filtered list of distractor candidates;
   selecting x top scoring distractor candidates from the filtered list of distractor candidates;
   generating a grammar practice item based on the original sentence and the x top scoring distractor candidates; and
   providing the grammar practice item to a consuming application or process.

2. The method of claim 1, wherein providing the grammar practice item comprises one or more of: causing the grammar practice item to be displayed in an electronic visual display, storing the grammar practice item in physical persistence, loading the grammar practice item into memory, or transmitting data encapsulating the grammar practice item over a computer network to a remote computing system.

3. The method of claim 1, wherein the at least one machine learning-based language model comprises a bidirectional encoder representations from transformers (BERT) model.

4. The method of claim 3 further comprising:
fine tuning the BERT model using an additional data set directed to grammar practice items.

5. The method of claim 1, wherein the at least one machine learning-based language model comprises a Bidirectional and Auto-Regressive Transformers Bayesian additive regression tree (BART) model.

6. The method of claim 5 further comprising:
fine tuning the BART model using an additional data set directed to grammar practice items.

7. The method of claim 1 wherein the filtering uses a plurality of heuristics to determine which, if any, of the distractor candidates to filter out from the generated plurality of distractor candidates.

8. The method of claim 7, wherein the heuristics include one or more of: filtering out distractor candidates having a relative score difference with a score of the original sentence beyond a first relative threshold, filtering out distractor candidates having a relative score difference with a score of the original sentence within a second relative threshold, or discarding the original sentence if any of the distractor candidates have a higher score.

9. The method of claim 1, wherein the filtering uses at least one machine learning model different from the at least one machine learning-based language model to determine which, if any, of the distractor candidates to filter out from the generated plurality of distractor candidates.

10. A system for automatic content generation comprising:
at least one data processor; and
memory storing instructions which, when executed by the at least one data processor, result in operations comprising:
receiving data comprising an original sentence with a grammar artifact of interest;
inputting the received data into a distractor generation function to generate a plurality of distractor candidates based on the original sentence with the grammar artifact of interest, each distractor candidate comprising a different variation of the original sentence with an error;
scoring, using at least one machine learning-based language model, each of the distractor candidates, the scores characterizing a likelihood of such distractor candidate being selected as part of an assessment by a subject, the scoring being based on: masking, for each of the distractor candidates, a location of each error within the corresponding variation of the original sentence; and obtaining a predicted token for the masked error locations from the machine learning-based language model;
filtering the distractor candidates to result in a filtered list of distractor candidates;
selecting x top scoring distractor candidates from the filtered list of distractor candidates;
generating a grammar practice item based on the original sentence and the x top scoring distractor candidates; and
providing the grammar practice item to a consuming application or process.

11. The system of claim 10, wherein providing the grammar practice item comprises one or more of: causing the grammar practice item to be displayed in an electronic visual display, storing the grammar practice item in physical persistence, loading the grammar practice item into memory, or transmitting data encapsulating the grammar practice item over a computer network to a remote computing system.

12. The system of claim 10, wherein the at least one machine learning-based language model comprises a bidirectional encoder representations from transformers (BERT) model.

13. The system of claim 12, wherein the operations further comprise:
fine tuning the BERT model using an additional data set directed to grammar practice items.

14. The system of claim 10, wherein the at least one machine learning-based language model comprises a Bidirectional and Auto-Regressive Transformers (BART) model.

15. The system of claim 14, wherein the operations further comprise:
fine tuning the BART model using an additional data set directed to grammar practice items.

16. The system of claim 10, wherein the filtering uses a plurality of heuristics to determine which, if any, of the distractor candidates to filter out from the generated plurality of distractor candidates.

17. The system of claim 16, wherein the heuristics include one or more of: filtering out distractor candidates having a relative score difference with a score of the original sentence beyond a first relative threshold, filtering out distractor candidates having a relative score difference with a score of the original sentence within a second relative threshold, or discarding the original sentence if any of the distractor candidates have a higher score.

18. The system of claim 10, wherein the filtering uses at least one machine learning model different from the at least one machine learning-based language model to determine which, if any, of the distractor candidates to filter out from the generated plurality of distractor candidates.

19. A method for automatic content generation for implementation by one or more computing devices comprising:
receiving data comprising an original sentence with a grammar artifact of interest;
inputting the received data into a distractor generation function to generate a plurality of distractor candidates based on the original sentence with the grammar artifact of interest, each distractor candidate comprising a different variation of the original sentence with an error;
scoring, using a fine-tuned bidirectional encoder representations from transformers (BERT) model, each of the distractor candidates, the scores characterizing a likelihood of such distractor candidate being selected as part of an assessment by a subject, the scoring being based on: masking, for each of the distractor candidates, a location of each error within the corresponding variation of the original sentence; and obtaining a predicted token for the masked error locations from the BERT model;
filtering the distractor candidates to result in a filtered list of distractor candidates;
selecting x top scoring distractor candidates from the filtered list of distractor candidates;
generating a grammar practice item based on the original sentence and the x top scoring distractor candidates; and
providing the grammar practice item to a consuming application or process.

* * * * *